(12) United States Patent
Green et al.

(10) Patent No.: US 7,394,371 B2
(45) Date of Patent: Jul. 1, 2008

(54) METHOD OF TRACKING AUTOMOTIVE PRODUCTION

(75) Inventors: Anne C. Green, Howell, MI (US); Lawrence C. Mallia, Plymouth, MI (US); Kenneth L. Butler, Plymouth, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 188 days.

(21) Appl. No.: 10/906,049

(22) Filed: Feb. 1, 2005

(65) Prior Publication Data

US 2005/0108115 A1    May 19, 2005

Related U.S. Application Data

(63) Continuation-in-part of application No. 09/565,815, filed on May 5, 2000, now abandoned.

(51) Int. Cl.
G08B 13/14 (2006.01)
G06F 17/00 (2006.01)
G06F 19/00 (2006.01)

(52) U.S. Cl. .................................... 340/572.1; 235/375
(58) Field of Classification Search ........................ None
See application file for complete search history.

(56) References Cited

U.S. PATENT DOCUMENTS 5,764,221 A * 6/1998 Willard ...................... 345/173
6,516,239 B1 * 2/2003 Madden et al. ............. 700/115

* cited by examiner

Primary Examiner—Julie Bichngoc Lieu
(74) Attorney, Agent, or Firm—Gary Smith

(57) ABSTRACT

A method of tracking automotive production in the manufacture of automotive vehicles (10) is provided. The method includes manufacturing a plurality of automotive vehicles along an assembly line (12). Each of the plurality of automotive vehicles having a build characteristic (13). The build characteristics varying among the plurality of automotive vehicles. The method includes installing a radio frequency transmitter within each of the plurality of automotive vehicles as they move along the assembly line (16). Each of the radio frequency transmitters generating a unique identifier signal (20). Associating each unique identifier signal with the build characteristics of one of the plurality of automotive vehicles (34). The method includes transferring the plurality of automotive vehicles to a plant storage lot as they exit the assembly line (14). The method includes receiving the unique identifier signals (30). The unique identifier signals are used to determine the identity and location of each of the plurality of automotive vehicles within the plant storage lot (40).

20 Claims, 1 Drawing Sheet

METHOD OF TRACKING AUTOMOTIVE PRODUCTION

CROSS REFERENCE TO RELATED APPLICATION

This application is a continuation-in-part of U.S. patent application Ser. No. 09/565,815 filed on May 5, 2000.

TECHNICAL FIELD

The present invention relates generally to a method of tracking inventory and more particularly to a method of tracking the position and movement of production automobiles within the automotive manufacturing and assembly environment.

BACKGROUND ART

The automotive industry must often manage large inventories of products. These inventories often can include a wide variety of different vehicles. Vehicles are often produced at rates such as forty or sixty vehicles per hour. This produces a continuous stream of new vehicles exiting the assembly line. The storage of these vehicles requires large storage areas. Because of this, automotive plants commonly utilize large parking facilities within the manufacturing plant grounds for storing and sorting vehicles. Additionally, the large number of vehicles is handled by a constant flow of vehicles out of storage to counter the flow of vehicles into storage.

The constant flow of vehicles to and from storage can create difficulties in the management of the inventory. The shipment of the wrong vehicle can create costly and time intensive problems. One known solution to such problems has been to track the individual vehicle through the use of a database. Although the use of such databases allows a general accounting of the inventory stock, it often does not prevent the shipment of the incorrect vehicle. If an incorrect vehicle is loaded by mistake and shipped, not only will the solution involve undesirable cost to fix, but also the resulting inventory within the database will likely be incorrectly reported. This is clearly undesirable.

One known solution to prevent the shipping of incorrect products has been to store differing products in separate areas within the storage area. While this may reduce that shipment of incorrect products, it can also have undesirable consequences. The sorting of vehicles into separate storage areas can increase handling costs and may lead to inefficient use of available storage area. In addition, the rate of vehicles flowing off the production line makes such sorting difficult. Also, the build characteristics of consecutive vehicles coming of the line often varies to fit specific orders. This would further confuse storage sorting. As the percentages of each differing build characteristic fluctuates, differing sized storage areas can be required. In addition, the use of separate storage areas also can become undesirable when the number of different vehicles becomes large. As the number of different build characteristics increases, the cost to sort and store such vehicles can become prohibitive. The cost, manpower, and time required for rearranging the storage area to accommodate fluctuations and large numbers of differing vehicles can be undesirable.

In addition to the problem of shipping incorrect vehicles, the large inventories can create additional problems. One such problem arises when specific individual vehicles with a given build characteristic need to be located. If a batch of vehicles with a particular build characteristic is identified as needing repair or recall, the identification of such vehicles may be difficult, costly, and occasionally impossible. The batch may include different vehicles that may be located in different sections of the storage area. In other situations, the specific vehicles may simply include custom products that need to be identified. Even when the general area of the storage facility can be identified as the location of the specific vehicle (such as by tracing production time), finding the specific vehicle can be difficult and costly.

It would therefore be desirable to have a method of tracking inventory that provided a reliable and accurate way to track the exact contents of an automotive storage facility. In addition, it would be desirable for a method that would reduce the shipments of incorrect vehicles, handle the storage of a wide variety of differing vehicles, and would allow specific individual vehicles of vehicle sub-groups to be quickly and efficiently located.

SUMMARY OF THE INVENTION

It is therefore an object of the present invention to provide an improved method of tracking production automobiles within the automotive manufacturing and assembly environment.

In accordance with the above and other objects of this invention a method of tracking automotive production in the manufacture of automotive vehicles is provided. The method includes manufacturing a plurality of automotive vehicles along an assembly line. Each of the plurality of automotive vehicles having a build characteristic. The build characteristics varying among the plurality of automotive vehicles. The method includes installing a radio frequency transmitter within each of the plurality of automotive vehicles as they move along the assembly line. Each of the radio frequency transmitters generating a unique identifier signal. Associating each unique identifier signal with the build characteristics of one of the plurality of automotive vehicles. The method includes transferring the plurality of automotive vehicles to a plant storage lot as they exit the assembly line. The method includes receiving the unique identifier signals. The unique identifier signals are used to determine the identity and location of each of the plurality of automotive vehicles within the plant storage lot.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
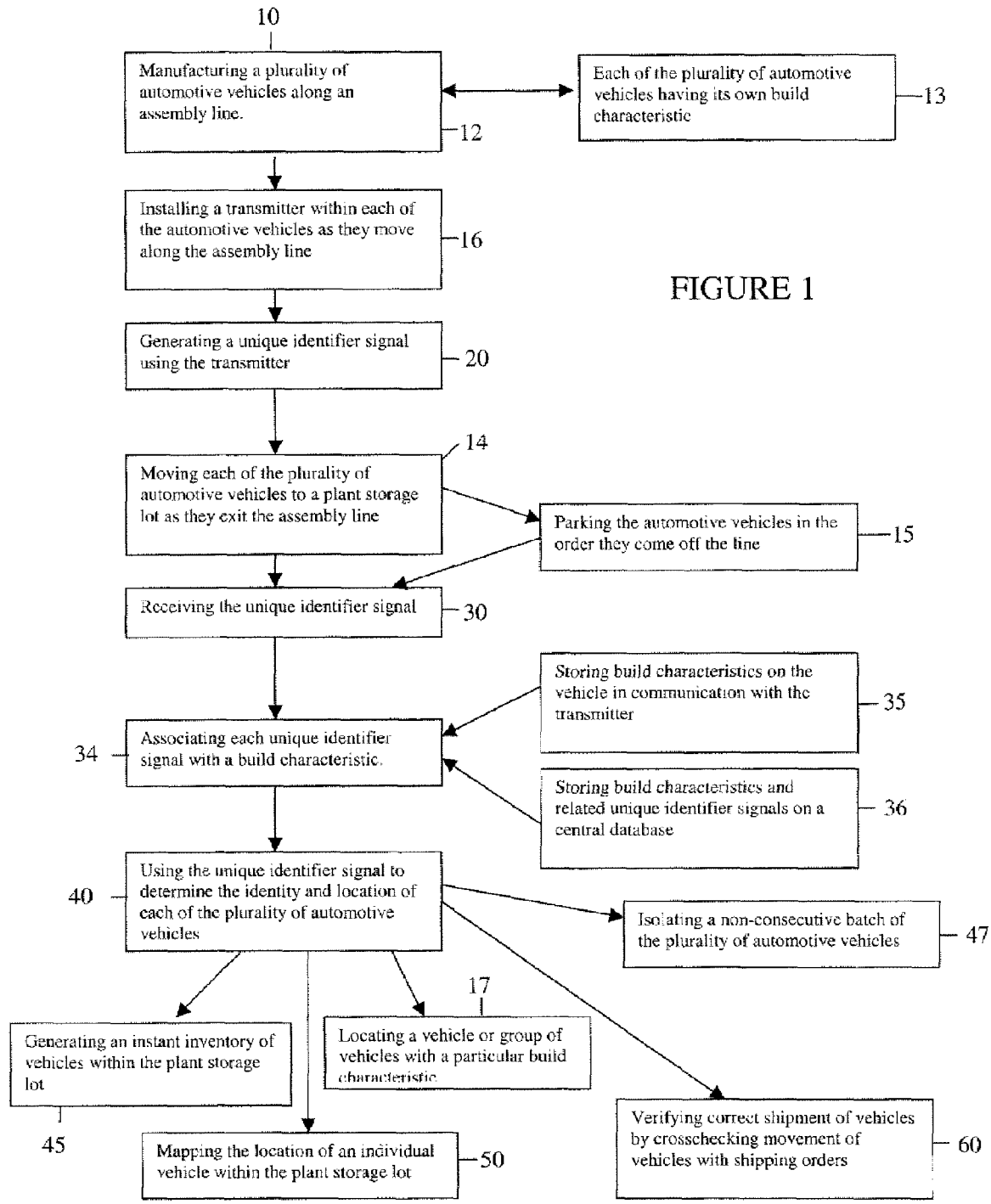
FIG. 1 is a flow chart illustrating a method of tracking automotive production in the manufacture of automotive vehicles in accordance with the present invention.

Referring now to FIG. 1, which is a diagram of an embodiment of a method of tracking automotive production in the manufacture of automotive vehicles is provided 10 in accordance with the present invention. The method of tracking automotive production in the manufacture of automotive vehicles 10 is intended for use in a wide variety of vehicle manufacturing and assembly plants. The method of tracking automotive production in the manufacture of automotive vehicles 10 is used to track the production and storage of vehicles within the facilities of an assembly plant. The principles, however, may be applicable to alternative automotive inventory applications and non-automotive applications.

The method of tracking automotive production in the manufacture of automotive vehicles 10 comprises manufacturing a plurality of automotive vehicles along an assembly line 12. Each of the plurality of automotive vehicles has a build characteristic 13 associated with it. Build characteristics are known to encompass a wide variety of assembly features that vary from vehicle to vehicle. For instance, vehicle color, varying sound systems, option packages, air-conditioning, anti-lock brakes, and other assembled vehicle characteristics all make up a build characteristic. Additionally, the build characteristics may include information such as the production lot numbers for individual parts assembled into the vehicle. For example, the lot number for a drive shaft received from a supplier. The nature of automotive manufacturing and assembly is such that the build characteristics of vehicles produced vary significantly even when only a single model of vehicle is being produced at the plant. In addition, often vehicles are produced based on direct order information or assembly constraints that make the build characteristics vary for even consecutive vehicles.

Modern automotive assembly facilities produce vehicles at a significant rate. Production rates of forty to sixty vehicles per hour are not uncommon. This means that a vehicle may be coming off the assembly line every minute. At this rate, the vehicles must be moved to an assembly plant storage lot 14 immediately as they exit the assembly line. This commonly is accomplished by parking the vehicles in the order they exit the assembly line 15. Time does not commonly permit sorting of the vehicles or reordering their parking if production order was changed. Therefore, the removal of a vehicle from the assembly line for repair can cause severe accounting errors if not reintroduced to the assembly line in the correct order before its neighboring vehicles exit and are moved into the plant storage lot. In addition, since build characteristics may vary throughout a production run, a later discovery of a faulty part may only effect a small portion of the vehicles within the plant storage lot. Yet locating these vehicles to replace the faulty part may pose considerable time and effort that may interfere with the plant production rates.

The present invention addresses this concern by installing a transmitter within each of the plurality of automotive vehicles as they move along the assembly line 16. Each transmitter generates a unique identifier signal 20. In one embodiment it is contemplated that the transmitter may be installed at the beginning of the assembly line such that the build characteristics of the vehicle can be logged to the unique identifier signal in a database as they are installed. In anther embodiment, the transmitter may be installed at the end of the assembly line such that reusable methodologies such as radio frequency hang tags hung from the vehicle rearview mirror may be used. A wider variety of mounting locations are provided as the vehicle approaches the end of the assembly line.

The unique identifier signal can be generated using a variety of methods including passive or active signal generation. Using active signal generation a signal is actively transmitted from the individual vehicle through the use of a signal-generating device such as a radio frequency transmitter. Using passive signal generation, the individual product generates the signal by reflecting a signal sent from an outside source. In one embodiment, generating a unique identifier signal 20 is accomplished through the use of radio frequency hang tags hung on the rear view mirror of vehicles in the plant storage lot. Although a radio frequency transmitter is described in this embodiment, a variety of active and passive signal generators are possible.

The vehicles as they exit the assembly line are transferred to a plant storage lot 14 immediately upon exiting the assembly line. This, in typical automotive plant productions results in a steady stream of vehicles exiting the assembly line and entering the plant storage lot 14. Since the vehicles are commonly parked in relation to the order they exiting the assembly line, their arrangement within the plant storage lot often bears no relationship to their build characteristics. Since shipping and orders are filled based on build characteristics rather than order of production, it can become imperative to locate vehicles with a certain build characteristic independent of order of production 17.

The present invention addresses this by associating each unique identifier signal with the build characteristics of one of the plurality of automotive vehicles (namely the build characteristics of the vehicle it is installed in) 34. This may be accomplished in a variety of fashions. In one embodiment the build characteristics can be stored on the vehicle in communication with the transmitter 35. In other embodiments, the build characteristics for each vehicle can be stored in a centralized database 36. This allows for the build characteristics of a received unique identifier signal to be determined. Using another database search, the unique identifier signals of every vehicle having a particular build characteristic can also be identified.

In addition to providing a nexus between unique identifier signal and build characteristic, the present invention additionally allows for precise spatial location of particular vehicles 40. The present invention receives the unique identifier signals 30 and utilizes them to determine the identity and location of the individual vehicles within the storage area 40. The unique identifier signal can be received using a variety of methods that correspond with the method of generating the signal. For example, when the signal is generated using a radio frequency transmitter, a radio frequency receiver can be used to receive the signal. The transmission and reception of signals is well known in the art and it is not intended to limit the present invention to any specific method of transmission or reception.

The determination of the precise spatial location of particular vehicles 40 can be accomplished through a variety of methods. Once known method utilizes signal triangulation to determine the precise location of the generated signal. Other known methods include, but are not limited to, determining location by signal strength. The determination of identity of the individual vehicle can be accomplished through a variety of methods. The vehicle identity can be a vehicle identification number or serial number commonly referred to as a VIN number. Alternatively, the identity can simply be the build characteristics of the specific vehicle. The unique identifier signal can contain all the build characteristics relative to a vehicle, or it can simply provide an identifier allowing the build characteristics to be determined. Although a specific signal application has been described, a variety of applications are contemplated.

This method of tracking automotive production in the manufacture of automotive vehicles 10 can be utilized in a variety of fashions. In one embodiment, the method is used to track the location and identity of existing vehicles within the plant storage lot such that an accurate up to the minute description of the inventory is provided 45. This instant inventor 45 can be critical to automotive production wherein the physical size of storage facilities makes manual inventory difficult. The automotive assembly plant environment is a complex production and storage facility wherein the flow of vehicles off the line and into the plant storage lot is matched in flow only by the continuous loading and shipping of vehicles from the plant storage lot. The time an effort to provide a continuous accounting of plant stored vehicles would be greatly alleviated by the present system. It is contemplated that the monitoring of the unique identifier signals may be located within a central office in the plant to allow inventory and shipping controls to be monitored from a single central location. In another scenario, the method is used such that when a specific individual vehicle needs to be located, precise directions to its location within the plant storage lot can be provided. This applies to a single vehicle or a grouping of vehicles. Isolating a non-consecutive batch of the plurality of automotive vehicles 47 (i.e. spread throughout the lot) is greatly simplified. Thus by way of example, if it is discovered that a batch of faulty valve stems were installed on vehicles with a tire upgrade option, the present invention allows the locating of this group quickly and easily even though the vehicles may be spread out throughout a large section of the plant storage lot. In such a case the searchable build characteristic is a cross-section of two or more vehicle characteristics (namely vehicles with a tire upgrade option that had tires installed during the period of time where the faulty batch was used). The present invention allows an accurate location of all these vehicles even if they are not parked anywhere near each other.

The present method may additional include mapping the location of an individual vehicle within the plant storage lot 50 (see FIG. 2). This is contemplated to include a physical representation of the plant storage lot 50 displayed on a video monitor. Display on a central computer allows a central computer to monitor the plant lot contents. Handheld computers, however, allow for plant employees to quickly locate individual vehicles. Each individual vehicle can be represented on the plant storage lot display by the unique identifier signal. The use of portable displays allows a worker to quickly identify and locate specific vehicles in the storage lot. A display within an inventory control room allows a manager or managing software to monitor the precise location and build characteristic of every vehicle within the plant storage lot.

An additional advantage of the present invention stems from its ability to monitor the vehicles within the plant storage lot such that the loading and shipping of the correct inventory can be verified by tracking the movement of individual vehicles within the plant storage lot. In this embodiment the method additionally includes verifying the correct shipment of and individual vehicle (or grouping of vehicles) by monitoring the movement of the individual vehicle within the plant storage lot 60 (see FIG. 3). It is contemplated that this can be accomplished by way of a computer automated system that cross-checks the movement of vehicles within the plant storage lot with electronic shipping orders. If the grouping of unique identifier signals moving towards a shipping container does not match the electronic shipping order a warning may be sounded. In this fashion, shipping monitoring does not require additional employee monitoring. In this way, the number of incorrect shipments can be reduced. Although specific uses of this business method have been described, a variety of uses are contemplated.

While particular embodiments of the invention have been shown and described, numerous variations and alternate embodiments will occur to those skilled in art. Accordingly, it is intended that the invention be limited only in terms of the appended claims.

What is claimed is:

1. A method of tracking automotive production in the manufacture of automotive vehicles comprising:
   manufacturing a plurality of automotive vehicles along an assembly line, each of said plurality of automotive vehicles comprising a build characteristic, the build characteristics varying among said plurality of automotive vehicles;
   installing a transmitter within each of said plurality of automotive vehicles as said plurality of automotive vehicles move along said assembly line;
   generating unique identifier signals using said transmitters;
   moving each of said plurality of automotive vehicles to a plant storage lot as they exit said assembly line;
   receiving said unique identifier signals;
   associating each of said unique identifier signals with one of said build characteristics; and
   using said unique identifier signals to determine the identity and location of said plurality of automotive vehicles.

2. A method of tracking automotive production as described in claim 1, wherein said generating unique identifier signals utilizes passive signal generation.

3. A method of tracking automotive production as described in claim 1, wherein said generating unique identifier signals utilizes active signal generation.

4. A method of tracking automotive production as described in claim 1, wherein said generating a unique identifier signal comprises generating a signal from a radio frequency hang tag.

5. A method of tracking automotive production as described in claim 1, further comprising:
   parking each of said plurality of automotive vehicles in a consecutive parking order as each of said plurality of automotive vehicles come off said assembly line.

6. A method of tracking automotive production as described in claim 1, further comprising:
   storing said build characteristics on each of said plurality of vehicles such that said build characteristics are transmitted through said transmitter.

7. A method of tracking automotive production as described in claim 1, further comprising:
   storing said build characteristics and said unique identifier signals on a central database.

8. A method of tracking automotive production as described in claim 1, further comprising:
   generating an instant inventory of said plurality of automotive vehicles within said plant storage lot using said unique identifier signals.

9. A method of tracking automotive production as described in claim 1, further comprising:
   mapping a location of one of said plurality of automotive vehicles within said plant storage lot using said unique identifier signals.

10. A method of tracking automotive production as described in claim 1, further comprising:
    locating one of said plurality of automotive vehicles, said one having a particular build characteristic using said unique identifier signals.

11. A method of tracking automotive production as described in claim 1, further comprising:
    isolating a non-consecutive batch of said plurality of automotive vehicles using said unique identifier signals.

12. A method of tracking automotive production as described in claim 1, further comprising:
    verifying a correct shipment of said plurality of automotive vehicles by way of cross-checking movement of said plurality of automotive vehicles using said unique identifier signals with electronic shipping orders.

13. A method of tracking automotive production as described in claim 12, wherein said cross-checking is automatically performed by a central computer system.

14. A method of tracking automotive production in the manufacture of automotive vehicles comprising:

manufacturing a plurality of automotive vehicles along an assembly line, each of said plurality of automotive vehicles comprising a build characteristic;

installing a transmitter within each of said plurality of automotive vehicles as said plurality of automotive vehicles move along said assembly line;

generating unique identifier signals using said transmitters;

receiving said unique identifier signals;

associating each of said unique identifier signals with one of said build characteristics; and using said unique identifier signals to determine the location of said plurality of automotive vehicles.

15. A method of tracking automotive production as described in claim 14, further comprising:

moving each of said plurality of automotive vehicles to a plant storage lot.

16. A method of tracking automotive production as described in claim 14, wherein said build characteristics comprise a supplier lot number.

17. A method of tracking automotive production as described in claim 14, wherein said generating a unique identifier signal comprises generating a signal from a radio frequency hang tag.

18. A method of tracking automotive production as described in claim 14, further comprising:

generating an instant inventory of said plurality of automotive vehicles using said unique identifier signals.

19. A method of tracking automotive production as described in claim 14, further comprising:

isolating a non-consecutive batch of said plurality of automotive vehicles using said unique identifier signals.

20. A method of tracking automotive production as described in claim 14, further comprising:

verifying a correct shipment of said plurality of automotive vehicles by way of cross-checking movement of said plurality of automotive vehicles using said unique identifier signals with electronic shipping orders.

* * * * *